US008681607B2

(12) United States Patent
Lu et al.

(10) Patent No.: US 8,681,607 B2
(45) Date of Patent: *Mar. 25, 2014

(54) DISJOINT PATH COMPUTATION ALGORITHM

(75) Inventors: Wenhu Lu, San Jose, CA (US); Sriganesh Kini, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 91 days.

This patent is subject to a terminal disclaimer.

(21) Appl. No.: 13/457,192

(22) Filed: Apr. 26, 2012

(65) Prior Publication Data

US 2012/0213063 A1   Aug. 23, 2012

Related U.S. Application Data

(63) Continuation of application No. 12/614,323, filed on Nov. 6, 2009, now Pat. No. 8,233,387.

(51) Int. Cl.
*G01R 31/08* (2006.01)
(52) U.S. Cl.
USPC .......................................................... 370/228
(58) Field of Classification Search
USPC ......... 370/217–218, 225–228, 241–242, 244, 370/248, 250; 714/1, 2, 25, 100; 709/238, 709/239
See application file for complete search history.

(56) References Cited

U.S. PATENT DOCUMENTS

| | | | |
|---|---|---|---|
| 6,829,347 | B1 | 12/2004 | Odiaka |
| 2003/0126287 | A1 | 7/2003 | Charny et al. |
| 2003/0193944 | A1 | 10/2003 | Sasagawa |
| 2006/0159009 | A1 | 7/2006 | Kim et al. |
| 2007/0286069 | A1 | 12/2007 | Xu |
| 2010/0157794 | A1 | 6/2010 | Nakash |
| 2010/0177631 | A1 | 7/2010 | Chen et al. |

OTHER PUBLICATIONS

Oki, E., et al., ""Extensions to the Path Computation Element Communication Protocol (PCEP) for Route Exclusions"", *Network Working Group, Request for Comments 5521*, Apr. 2009, 16 pages, IETF Trust.

*Primary Examiner* — Kwang B Yao
*Assistant Examiner* — Tung Q Tran
(74) *Attorney, Agent, or Firm* — Blakely, Sokoloff, Taylor & Zafman, LLP

(57) ABSTRACT

A network element implementing Multiprotocol Label Switching to automatically create an optimal deterministic back-up Label Switch Path (LSP) that is maximally disjointed from a primary LSP to provide a reliable back up to the primary LSP. The network element receives a request for a generation of an LSP, determines that the request for the generation of the LSP is for the back-up LSP, locates each link of the primary LSP in a traffic engineering database, modifies each link of the primary LSP to have a link cost significantly greater than an actual link cost to discourage use of each link of the primary LSP in the back-up LSP, executes a Constrained Shortest Path First algorithm to obtain the back-up LSP, wherein the back-up LSP has a maximum disjointedness from the primary LSP due to a modified cost of each link of the primary LSP, and returns the back-up LSP.

18 Claims, 2 Drawing Sheets

DISJOINT PATH COMPUTATION ALGORITHM

CROSS-REFERENCE TO RELATED APPLICATION

The present patent application is a continuation of application Ser. No. 12/614,323, filed Nov. 6, 2009.

FIELD OF THE INVENTION

Embodiments of the present invention relate to a system for managing multiprotocol label switching over a network. Specifically, the embodiments of the invention relate to a method and system for determining an optimal back-up path for a primary label switch path.

BACKGROUND

Multiprotocol label switching (MPLS) is a technology utilized to manage traffic over a network. MPLS uses labels that are assigned to a stream of traffic to route the traffic across the network. Each node of the network supports MPLS by reviewing incoming traffic received over the network and forwarding that traffic based on its label.

MPLS networks with traffic engineering capabilities can optimize traffic engineering resource allocation for customized traffic services. In MPLS networks with traffic engineering, the primary label switch path (LSP) is set up for each customized traffic service. The primary LSP is calculated using a constrained shortest path first (CSPF) algorithm. The primary LSP is usually calculated at the head-end node, which is the node where a path originates. The establishment of the primary LSP can be automated. The automated generation of an LSP can be done by the head-end node or a separate path computation element (PCE).

A back-up LSP for each customized traffic service is utilized in case of a failure of the primary LSP and must be configured manually. Each of the links in the back-up LSP is manually selected to construct a back-up LSP with a goal of creating a disjointed path that can be relied upon when the primary LSP is in a state of failure. The techniques for manual configuration of the back-up LSP include link coloring and node exclusion.

However, these techniques rely heavily on an administrator to manually configure the back-up LSP. As a result, the configuration of the back-up LSP is prone to human error. The administrators that are establishing the back-up LSPs have to verify themselves that the back-up LSPs meet all the constraints or requirements of the customized traffic service. They must manually determine that the back-up LSPs provide the maximum possible protection or have the maximum disjointedness from the primary LSPs.

SUMMARY

A method performed on a network element implementing Multiprotocol Label Switching (MPLS) to automatically create an optimal deterministic back-up Label Switch Path (LSP) that is maximally disjointed from a primary LSP to provide a reliable back up to the primary LSP, the method comprising the steps of: receiving a request for a generation of an LSP by the network element via a signaling protocol; determining that the request for the generation of the LSP is for the back-up LSP; locating each link of the primary LSP in a traffic engineering database in response to determining that the request is for the back-up LSP; modifying each link of the primary LSP in the traffic engineering database to have a link cost other than an actual link cost to discourage use of each link of the primary LSP in the back-up LSP; executing a Constrained Shortest Path First (CSPF) algorithm on the traffic engineering database to obtain the back-up LSP, wherein the back-up LSP has a maximum disjointedness from the primary LSP due to a modified cost of each link of the primary LSP in the traffic engineering database; and returning the back-up LSP via the signaling protocol.

A system for implementing Multiprotocol Label Switching (MPLS) to automatically create an optimal deterministic back-up Label Switch Path (LSP) that is maximally disjointed from a primary LSP to provide a reliable back up to the primary LSP, the system comprising: a label switch router configured to receive a request for a generation of an LSP and configured to call a path computation element to obtain the LSP and to return the LSP to a requestor; and the path computation element (PCE) coupled to the label switch router, the PCE configured to determine whether the request for the generation of the LSP is for a back-up LSP, wherein the PCE is configured to locate each link of the primary LSP in a traffic engineering database, wherein the PCE is configured to modify each link of the primary LSP in the traffic engineering database to have a modified cost, wherein the modified cost discourages use of a link of the primary LSP in the back-up LSP, wherein the PCE is configured to execute a Constrained Shortest Path First (CSPF) algorithm on the traffic engineering database to obtain the back-up LSP, wherein the back-up LSP has a maximum disjointedness from the primary LSP due to the modified cost of each link of the primary LSP used in the back-up LSP calculation and wherein the PCE is configured to return the back-up LSP to the first label switch router.

A network element for implementing Multiprotocol Label Switching (MPLS) to create an optimal deterministic back-up Label Switch Path (LSP) that is maximally disjointed from a primary LSP to provide a reliable back up to the primary LSP, the network element comprising: a traffic engineering database configured to store link state information for a network topology including link state information for a primary LSP; a back-up path calculation module coupled to the traffic engineering database and configured to process a request for the back-up LSP, the back-up path calculation module is configured to locate each link of the primary LSP in a traffic engineering database and to modify each link of the primary LSP in the traffic engineering database to have a cost other than an actual cost to discourage use of each link of the primary LSP in the back-up LSP; and a best path determination module coupled to the back-up path calculation module to determine a best path to a destination node using the link state information from the traffic engineering database.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
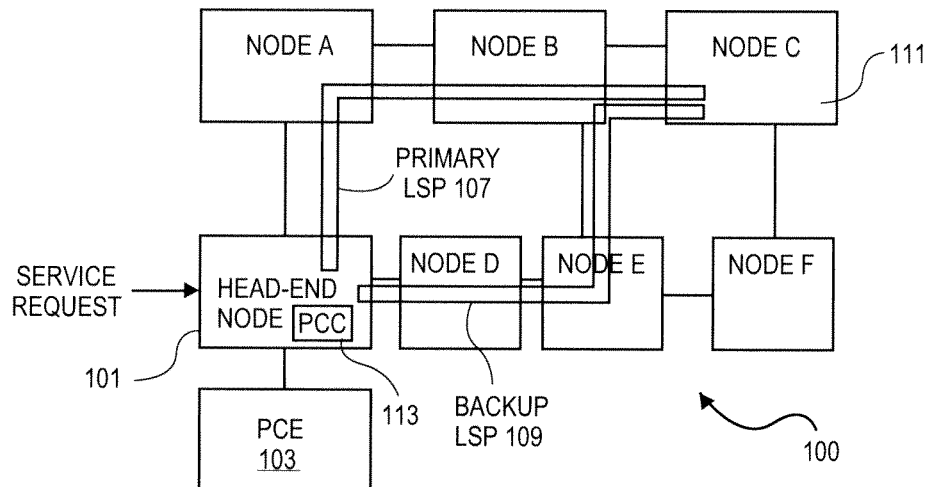
FIG. 1 is a diagram of one embodiment of a network implementing multiprotocol label switching.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagram will be described with reference to the exemplary embodiments of FIG. 1 and FIG. 2. However, it should be understood that the operations of flow diagram can be performed by embodiments of the invention other than those discussed with reference to FIG. 1 and FIG. 2, and the embodiments discussed with reference to FIG. 1 and FIG. 2 can perform operations different than those discussed with reference to the flow diagram of FIG. 3.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable or computer-readable media, such as machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage device and signals carrying the network traffic respectively represent one or more machine-readable or computer-readable storage media and machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a system, network and method for avoiding the disadvantages of the prior art including: human error, non-optimal label switch paths (LSP), non-maximally disjointed primary and back-up LSPs, deterministic generation of back-up LSPs, and time and resource intensive use of administrator to manually set up back-up LSPs.

The embodiments of the invention overcome these disadvantages 'poisoning' the path of a primary LSP in a traffic engineering database, where each link is given a high or maximum cost to discourage, but not prohibit the use of the links of the primary LSP when generating a back-up LSP. Once the links of the primary LSP are modified in this manner a path finding algorithm such as the constrained shortest path first (CSPF) algorithm can be used to automatically determine an optimum back-up LSP detemistically that is maximally disjointed from the primary LSP. The link costs of the primary LSP are the resets.

FIG. 1 is a diagram of one embodiment of a network implementing MPLS. The example network 100 includes nodes A-F. In other embodiments, any number of nodes can be presented in the network too. Each of the nodes can be any type of computing device including a computer or network element. The computing devices can include a desktop computer, laptop computer, networking element, router, server or similar computing device. Each of the nodes can be connected over any networking medium and as any size or configuration of a network. The network can be a local area network (LAN), wide area network (WAN), such as the Internet or a similar communication system. Each of the nodes in the network 100 supports MPLS or similar technology for the managing of traffic across the network 100 according to a label switch path (LSP). The networking medium can be any wired or wireless networking technology. The network 100 can include a head-end node 101 and a destination node 111. An LSP starts at the head-end node 101 and ends at the destination node 111. Any number of nodes in the network 100 can save as head-end nodes or destination nodes for separate LSPs.

The head-end node 101 establishes the primary LSP 107 in response to a traffic service request. The head-end node 101 can also establish the primary LSP 107 for each traffic service on the network 100. The head-end node 101 can include a path computation element (PCE) 103 that computes the primary LSP 107. In another embodiment, the PCE 103 is a separate device or otherwise separate from the head-end node 101. In this embodiment, the head-end node 101 communicates with a PCE through a path computation client (PCC).

The head-end node 101 is also responsible for establishing a back-up LSP 109. The back-up LSP 109 is ideally an LSP having a maximum disjointedness from the primary LSP 107, while still having the best, most efficient or optimal route from the head-end node 101 to the destination node C 111. The PCE 103 can also compute the back-up LSP 109. The back-up LSP 109 can be computed whenever a primary LSP 107 is generated or in response to a traffic service request indicating a back-up LSP is to be calculated.

In the example network 100, each of the links between the nodes A-F have the same bandwidth, for example, one gigabit per second, except the link between nodes C and F. This link has a bandwidth of 0.5 gigabits per second. A traffic service request processed by the head-end node for an LSP from the head-end node 101 to the destination node C that has a bandwidth requirement of 1 gigabit per second. The primary LSP 107 passes through nodes A, B and C as the most direct route with the fewest hops. To generate the back-up LSP 109 simply using the same constrained shortest path first (CSPF) algorithm or similar algorithm would generate the same route as the primary LSP 107. If each link of the primary LSP 107 is excluded, then the back-up LSP 109 would be forced to include the link between node F and C, which does not meet the constraints of the traffic service request. The PCE, as described in further detail herein below, generates the back-up LSP 109 by weighting each of the links of the primary LSP 107 with a maximum cost thereby discouraging the use of these links, but not prohibiting them. With this altered weighting or cost, the CSPF or similar path finding algorithm is executed, which would deliver the best path based on cost for the modified topology. The resulting back-up LSP 109 offers the maximum disjointedness from primary LSP 107, while still preserving the constraints of the traffic service being requested. The back-up LSP 109 still includes the link between node B and C, shared with the primary LSP 107, demonstrating a flexibility in using the links of the primary LSP 107 when necessary.

Figure 2:
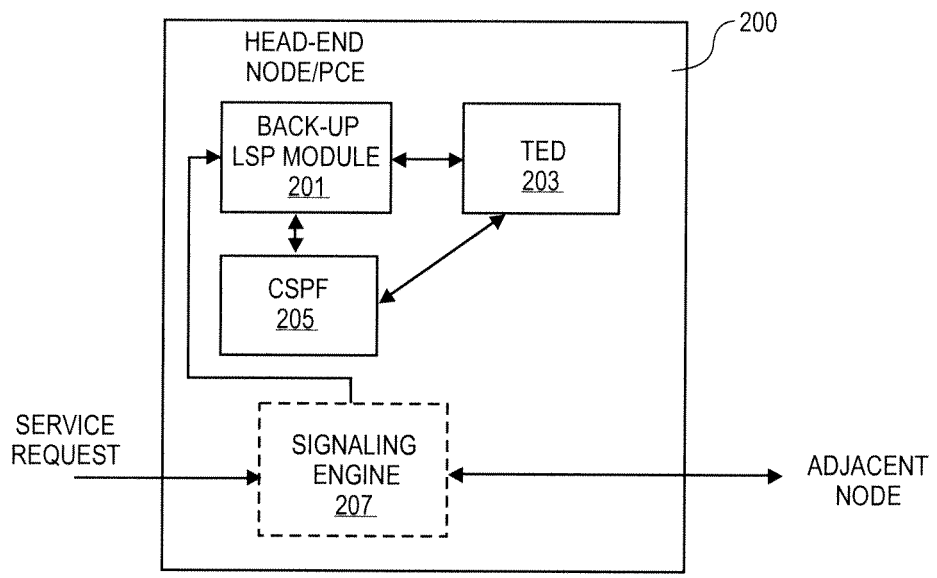
FIG. 2 is a diagram of one embodiment a head-end node or path computation element.

FIG. 2 is a diagram of one embodiment of a head-end node or PCE. The functionality of calculating the back-up LSP can be implemented in either the head-end node or in a separate PCE with which the head-end node communicates through a PCC in the head-end node. In one embodiment, where the head-end node implements this functionality, the functionality may still be segmented into a discrete PCE that is incorporated into the head-end node. One of ordinary skill in the art would understand that only those components of the head-end node or PCE that are directly relevant to the calculation of the back-up LSP are shown. The head-end node or PCE can have all the standard functionality and components necessary for calculating the primary LSP and other similar functions. In one embodiment, the head-end node or PCE includes a back-up LSP module 201, traffic engineering database 203 and a constrained shortest path first (CSPF) module 205. In one embodiment, where the functionality is implemented in the head-end node, a signaling engine 207 is present that services a traffic service request and forwards the traffic to adjacent nodes.

The back-up LSP module 201 is responsible for generating a back-up LSP and establishing the back-up LSP between head-end node and the destination node. The back-up LSP module 201 modifies the traffic engineering database 203 to 'poison' or give a maximum cost to each of the links of a primary LSP. The back-up LSP module 201 then requests that the CSPF module 205 calculate the back-up LSP based on the modified traffic engineering database 203. The CSPF module 205 is unaware of the modified nature of the traffic engineering database 203 and makes a normal calculation of the best LSP. After the back-up LSP is returned to the back-up LSP module 201 by the CSPF module 205, the back-up LSP module 201 again modifies the traffic engineering database to restore the original values showing the actual cost for each of the links in the primary LSP. Upon failure of the primary LSP, the back-up LSP can be utilized by the signaling engine to forward the associated traffic over the network.

Figure 3:
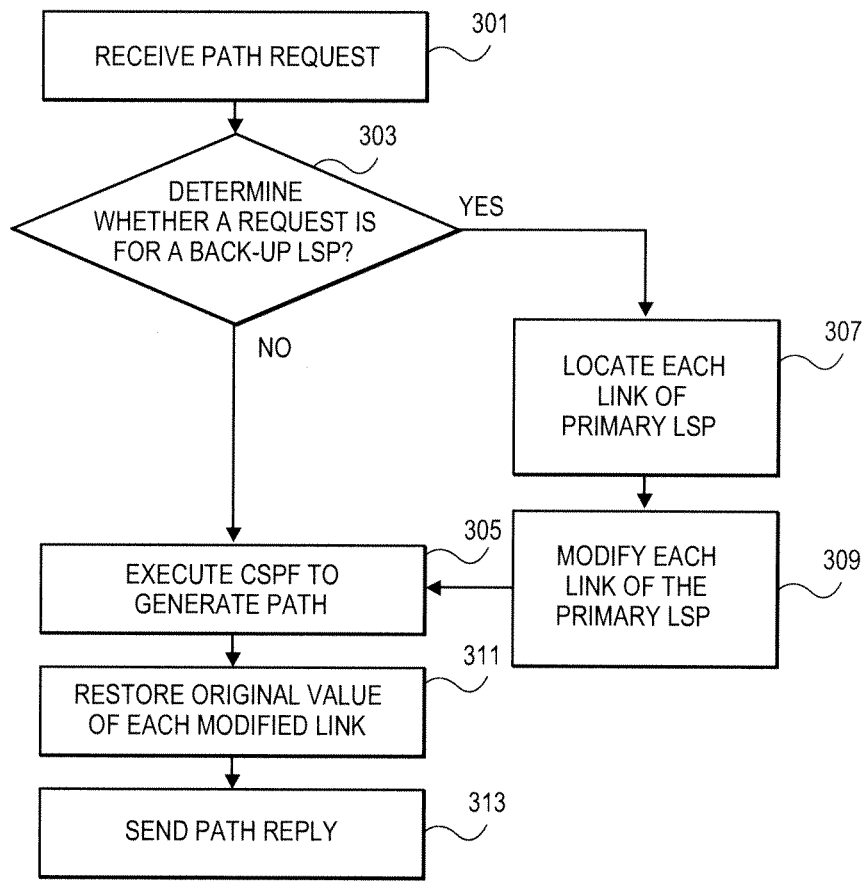
FIG. 3 is a flowchart of one embodiment of the process for generating a back-up label switching path.

FIG. 3 is a flowchart of one embodiment of a process for calculating a back-up LSP. In one embodiment, the process is initiated in response to a label switch path creation request or a traffic servicing request (Block 301). This request can be generated by any node in communication with the head-end node or PCE on the network. In one embodiment, this request is received by the head-end node or forwarded by the head-end node to the PCE. Upon receipt, the request must be analyzed to determine whether the request is for a primary LSP or a back-up LSP (Block 303). In another embodiment, the request for a primary LSP automatically initiates the generation of a back-up LSP after the completion of the primary LSP. The back-up LSP cannot be computed until the primary LSP computation is completed. If the received request is to generate a back-up LSP, then each link of the primary LSP must be located in the traffic engineering database (Block 307). The links can be located by the label or similar identifier associated with the primary LSP. Each link of the primary LSP identified in the traffic engineering database is modified (Block 309). The modification may give any value to the link defining its cost. In one embodiment, this cost is a maximum cost or any amount that is significantly greater than the other links of the network topology such that the use of the primary LSP links is heavily discouraged in the calculation of the back-up LSP.

After each of the links has been modified, then the best path is computed using CSPF or a similar path finding algorithm identical to that used for calculating the primary LSP (Block 305). The CSPF algorithm relies on the modified link information and as a result generates a back-up path that is maximally disjointed yet optimum in meeting the constraints of the traffic service request. After the back-up LSP has been computed the original value of each of the modified links is restored (Block 311). The back-up LSP is then supplied to the requestor for use in traffic forwarding and establishing the LSP over the MPLS network (Block 313).

In the case where the received request is not for back-up LSP, then the process simply computes the best path using the existing traffic engineering data (Block 305). This primary LSP is returned in reply to the requestor to establish the primary LSP over the MPLS network.

Thus, a method, system and apparatus for back-up LSP calculation in a network implementing MPLS have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method performed on a network element implementing Multiprotocol Label Switching (MPLS) to automatically create an optimal deterministic back-up Label Switch Path (LSP) that is maximally disjointed from a primary LSP to provide a reliable back up to the primary LSP, the method comprising the steps of:

receiving a request for a generation of an LSP by the network element via a signaling protocol;

determining that the request for the generation of the LSP is for the back-up LSP; locating each link of the primary LSP in a traffic engineering database in response to determining that the request is for the back-up LSP;

modifying each link of the primary LSP in the traffic engineering database to have a link cost other than an actual link cost to discourage use of each link of the primary LSP in the back-up LSP;

executing a Constrained Shortest Path First (CSPF) algorithm on the traffic engineering database to obtain the back-up LSP, wherein the back-up LSP has a maximum disjointedness from the primary LSP due to a modified cost of each link of the primary LSP in the traffic engineering database; and returning the back-up LSP via the signaling protocol.

2. The method of claim 1, further comprising the steps of: restoring a cost value for each link of the primary LSP in the traffic engineering database to have an original cost after the back-up LSP is determined.

3. The method of claim 1, further comprising the steps of: switching to the back-up LSP in response to detection of a failure in the primary LSP.

4. The method of claim 1, wherein the request is received from a path communication client.

5. The method of claim 1, wherein the step of locating each link of the primary LSP in the traffic engineering database uses an MPLS label.

6. The method of claim 1, wherein the back-up LSP includes at least one link of the primary LSP.

7. A system for implementing Multiprotocol Label Switching (MPLS) to automatically create an optimal deterministic back-up Label Switch Path (LSP) that is maximally disjointed from a primary LSP to provide a reliable back up to the primary LSP, the system comprising:

a label switch router configured to receive a request for a generation of an LSP and configured to call a path computation element to obtain the LSP and to return the LSP to a requestor; and the path computation element (PCE) coupled to the label switch router, the PCE configured to determine whether the request for the generation of the LSP is for a back-up LSP, wherein the PCE is configured to locate each link of the primary LSP in a traffic engineering database, wherein the PCE is configured to modify each link of the primary LSP in the traffic engineering database to have a modified cost, wherein the modified cost discourages use of a link of the primary LSP in the back-up LSP, wherein the PCE is configured to execute a Constrained Shortest Path First (CSPF) algorithm on the traffic engineering database to obtain the back-up LSP, wherein the back-up LSP has a maximum disjointedness from the primary LSP due to the modified cost of each link of the primary LSP used in the back-up LSP calculation and wherein the PCE is configured to return the back-up LSP to the first label switch router.

8. The system of claim 7, wherein the PCE is configured to restore a cost value for each link of the primary LSP in the traffic engineering database to have an original cost after obtaining the back-up LSP.

9. The system of claim 7, wherein the label switch router is configured to switch to the back-up LSP in response to detection of a failure in the primary LSP.

10. The system of claim 7, wherein the label switch router includes a path communication client to send the request to the PCE.

11. The system of claim 7, wherein the PCE is configured to identify each link of the primary LSP in the traffic engineering database by an MPLS label.

12. The system of claim 7, wherein the PCE is a component of a device separate from label switch router.

13. A network element for implementing Multiprotocol Label Switching (MPLS) to create an optimal deterministic back-up Label Switch Path (LSP) that is maximally disjointed from a primary LSP to provide a reliable back up to the primary LSP, the network element comprising:

a traffic engineering database configured to store link state information for a network topology including link state information for a primary LSP;

a back-up path calculation module coupled to the traffic engineering database and configured to process a request for the back-up LSP, the back-up path calculation module is configured to locate each link of the primary LSP in a traffic engineering database and to modify each link of the primary LSP in the traffic engineering database to have a cost other than an actual cost to discourage use of each link of the primary LSP in the back-up LSP; and a best path determination module coupled to the back-up path calculation module to determine a best path to a destination node using the link state information from the traffic engineering database.

14. The network element of claim 13, wherein the back-up path calculation module is configured to restore a cost value for each link of the primary LSP in the traffic engineering database to have the actual cost after obtaining the back-up LSP.

15. The network element of claim 13, wherein the back-up path calculation module is configured to locate each link of the primary LSP in the traffic engineering database by MPLS label.

16. The network element of claim 13, wherein the request is received from a path communication client.

17. The network element of claim 13, wherein the back-up LSP includes at least one link of the primary LSP.

18. The network element of claim 13, wherein the best path determination module implements a Constrained Shortest Path First algorithm.

* * * * *